US010146708B2

(12) United States Patent
Clark et al.

(10) Patent No.: US 10,146,708 B2
(45) Date of Patent: Dec. 4, 2018

(54) USB PORT LOCK AND ELECTRONIC KEY DEVICE PROGRAMMING SYSTEM

(71) Applicant: TERRALINK MARKETING SERVICES CORPORATION, INC., Harvest, AL (US)

(72) Inventors: Jeffery P Clark, Harvest, AL (US); Gabriel Goldstein, Wellington, FL (US)

(*) Notice: Subject to any disclaimer, the term of this patent is extended or adjusted under 35 U.S.C. 154(b) by 0 days.

(21) Appl. No.: 15/815,469

(22) Filed: Nov. 16, 2017

(65) Prior Publication Data

US 2018/0081831 A1 Mar. 22, 2018

Related U.S. Application Data

(63) Continuation of application No. 15/087,810, filed on Mar. 31, 2016, now Pat. No. 9,858,212.

(51) Int. Cl.
| | | |
|---|---|---|
| *G08B 21/00* | (2006.01) | |
| *G06F 13/10* | (2006.01) | |
| *G06F 21/83* | (2013.01) | |
| *H01R 13/453* | (2006.01) | |
| *G06F 21/85* | (2013.01) | |
| *G06F 21/88* | (2013.01) | |

(52) U.S. Cl.
CPC ............ *G06F 13/102* (2013.01); *G06F 21/83* (2013.01); *G06F 21/85* (2013.01); *G06F 21/88* (2013.01); *H01R 13/4538* (2013.01)

(58) Field of Classification Search
CPC .... G06F 13/102; G06F 21/83; H01R 13/4538
USPC ........................................................ 340/5.22
See application file for complete search history.

(56) References Cited

U.S. PATENT DOCUMENTS

| | | |
|---|---|---|
| 5,752,883 A | 5/1998 | Butcher et al. |
| 7,128,586 B2 | 10/2006 | Kung |
| 7,390,201 B1 | 6/2008 | Quinby et al. |
| 7,428,834 B1 | 9/2008 | Lee |
| 7,462,045 B1 | 12/2008 | Lee |
| 7,578,691 B2 | 8/2009 | Weksler et al. |
| 7,581,417 B1 | 9/2009 | Chen |
| 7,635,272 B2 | 12/2009 | Poppe |
| 7,913,527 B2 | 3/2011 | Chen |
| 2004/0074264 A1 | 4/2004 | Kung et al. |
| 2005/0174238 A1* | 8/2005 | Foseide .............. G08B 13/1418 340/568.4 |
| 2007/0175248 A1 | 8/2007 | Wu et al. |
| 2014/0130555 A1 | 5/2014 | Clark |
| 2015/0020189 A1 | 1/2015 | Soffer |

\* cited by examiner

*Primary Examiner* — Mark S Rushing
(74) *Attorney, Agent, or Firm* — Cynthia R. Wright (57) ABSTRACT

The present invention relates to a programming system for a USB locking dongle that locks into a USB computer port. The programming system comprises programming a specific key device to unlock a specific USB locking dongle. The USB locking dongle is unlocked from the USB computer port independently of any input from the host computer.

13 Claims, 11 Drawing Sheets

USB PORT LOCK AND ELECTRONIC KEY DEVICE PROGRAMMING SYSTEM

CROSS-REFERENCE TO RELATED APPLICATIONS

This application is a continuation of U.S. Non-Provisional application Ser. No. 15/087,810 filed on Mar. 31, 2016 which was invented by Jeffrey P. Clark and Gabriel Goldstein.

STATEMENT REGARDING PRIOR DISCLOSURES BY THE INVENTOR OR A JOINT INVENTOR

The inventors have not disclosed this invention prior to the filing of this non provisional application.

BACKGROUND OF THE INVENTION

(1) Field of the Invention

Computers are at risk of attack from viruses introduced via thumb drive and from theft of data which can be copied onto a USB thumb drive and transported by unauthorized individuals. This present invention relates to a lock for USB ports on personal computers and other electronic devices. More particularly, the present invention relates to a programming system for a USB port locking device. The programming system programs both the locking of a USB dongle that physically locks into the USB port and a separate electronic key device that electronically unlocks the USB dongle.

(2) Disclosure of the Prior Art

All computers containing a USB port are at risk of attack from viruses transmitted via thumb drive. Computers used in a work environment, particularly secure environments such as government facilities, banking, and corporate offices, are all at risk of attack from viruses and malware transmitted via thumb drives, backup hard drives, cell phones and other devices that an employee or end user may plug into a USB port of the computer. In other instances, hackers and spies have been known to penetrate a computer network by first loading an infectious file onto a portable device such as a USB thumb drive, a tablet device, or a mobile phone. When an individual plugs their mobile phone or thumb drive device containing a virus into a computer that is on a network, typically via a USB port, a virus can be launched. This virus will be launched from within the computer network, allowing it to circumvent the computer's firewall. One example of this is the infection via thumb drive on the computers controlling Iran's nuclear material centrifuges with the Stuxnet worm, resulting in the elimination of approximately twenty percent of Iran's nuclear enrichment capability.

Today, large files including secret or proprietary information may be quickly and easily copied onto a USB thumb drive and the data contained within said files misappropriated or stolen. USB thumb drives are small, easily hidden, and often embedded into common items like key chains and ink pens. A data thief with access to a computer network can utilize a USB thumb drive to copy and steal data undetected.

Numerous devices are available that prevent access to a USB port. Kung (U.S. Pat. No. 7,128,586 B2) discloses a USB lock wherein a lock piece is inserted into a USB port. The lock piece inserted into the USB port functions as a plug blocking all access to the port. The lock piece remains in the USB port and can not be removed. Although this device eliminates access to the USB port, the locking device is not removable resulting in a permanent loss of access to the port.

Quinby (U.S. Pat. No. 7,390,201 B1) discloses a device to plug a USB port. The invention of Quinby comprises a plug that has at least one engagement member to partially extend through at least one aperture of the plug and lock to at least one structure within the USB connector receptacle. The Quinby device is not designed to be removed. If future use of the USB port is desired, then Quinby has an alternate embodiment that plugs the USB port but allows unfettered access to an attached port. Although the locking mechanism employed by Quinby securely blocks access to the USB port, none of the embodiments disclosed provides for removal of the USB port plug without damaging the port.

Numerous mechanical devices have disclosed physical methods of locking computer ports via USB thumb drive locks. Lee (U.S. Pat. No. 7,462,045 B1) discloses a connector lock with a plug that fits within a USB port and a mechanical key that unlocks said plug. The retaining members that actually lock the plug into the USB port protrude outward from the sides of the plug. This arrangement of the pins is easy to unlock by anyone possessing a pair of tweezers or similar device. Lee also discloses that only the correct key can unlock the plug. But, anyone with a similarly configured key could release the plug and gain access to the USB port. Additionally, it would be relatively easy to create a similarly shaped device to operate as a key to release the plug from the port.

Lee (U.S. Pat. No. 7,428,834 B1) discloses a USB port plugging device comprising a locking member that plugs the port. The locking member utilizes two barbs that are extended down into the USB port plugging the port. A cylindrical key fits into the locking member to lock and unlock the device. The key has a T-shaped extension that fits into an opening on the plug. Upon insertion and turning of the T-shaped extension, the plug is released from the USB port. Anyone having access to a similarly shaped key or object would be able to access the port. Additionally, it would not be difficult for a data thief to fashion his or her own key to unlock the plug.

Other references disclose mechanical devices that lock and block USB ports. Poppe (U.S. Pat. No. 7,635,272 B2) discloses a lock for USB ports including a locking member with retractable barbs that engage the USB port, blocking access to the port. Poppe utilizes a key of a certain shape that fits into the locking member to retract the locking barbs. Anyone having access to the key would be able to remove the port lock and access data contained on the electronic equipment. Additionally, it would be relatively simple to fashion a key of similar shape to unlock the device.

Several devices disclose electronic USB port locking devices that unlock when a numerical code is correctly entered. Wu (US 2007/0175248 A1) discloses a mechanical lock to be used on electronic devices. The locking member fits into a port and locks into position via two barbs that protrude from the sides of the device. The lock contains a set of three dials wherein a user dials the correct combination of numbers to unlock the device. Anyone with access to the code could successfully unlock the device and have access to the data contained within the electronic device. Additionally, because of the location of the locking barbs, anyone with a pair of tweezers or a similar instrument could simply insert the tweezers into the sides of the USB port and squeeze on the barbs, releasing them from engaging the sides of the USB port on the computer or electronic device. Chen (U.S. Pat. No. 7,913,527 B2 and U.S. Pat. No. 7,581,417 B1) discloses a USB port locking device wherein a combination lock is incorporated within the USB device. Chen requires a 5 number numerical code to unlock the device. The Chen device is secured into the USB port by two hooking arms that are compressed downward when the device is inserted into a USB port. Anyone with access to the combination would be able to remove the locking member and have access to the USB port.

Weksler et al. (U.S. Pat. No. 7,578,691 B2) discloses a USB port locking device wherein one or more pins of the device are engaged and disengaged in response to an electrical signal generated within the USB locking device. This electrical signal is generated when the correct password is entered into the computer (U.S. Pat. No. 7,578,691 B2). This device is easily penetrated by anyone obtaining the password.

BRIEF SUMMARY OF THE INVENTION

The USB Port Lock and Electronic Key Device Programming System comprises a USB locking dongle that is locked into a USB port and an electronic key that unlocks the USB locking dongle. The USB Port Lock and Electronic Key Device Programming System can be mechanically engaged within the USB port irrespective of whether the computer is powered on. The dongle has an external locking interface that engages at least one protruding barb with the female connector of a standard USB port socket. The dongle comprises an external lock housing that slides over the inner case. The locking blade is hard fixed to the external lock housing of the dongle. When a user manually slides the external lock housing over the inner case, a sliding member forces the protruding tabs to extend downward into the USB port. Activation of an electromagnet within the dongle unlocks the locking blade and disengages the protruding arms. The electromagnet unlocks the USB dongle in response to an electrical signal generated by an electronic key. The key can be any device that can store a plurality of encrypted data bits. One embodiment uses an iButton® as a key. An iButton® device is a computer chip enclosed within a 16 mm thick stainless steel can. Computer software is utilized to maintain key codes and program an iButton® or other memory device with a programmable security code to unlock the USB Port Lock and Electronic Key Device Programming System. A personal computer is attached to a programming station where integration and programming of each electronic key and the USB locking dongle is performed.

The present invention is superior to the prior art listed above because it incorporates both a mechanical and an electrical lock into the same locking device. Therefore, in order to release the physical lock after insertion into a USB port, the user is required to have an electronic key capable of generating an electrical signal to unlock the device. If an unauthorized user obtains or creates an electronic key, said key will be inoperable because only a key having the correctly coded electrical signal will be able to successfully unlock the USB dongle. Thus, this invention provides much greater security for devices with USB ports. If the key is lost, then a new key can be programmed to remove the locking dongle. Additionally, the present invention can be incorporated into a programming system wherein a system administrator can program and maintain security for a number of computers within a network of computers. An unauthorized user can not simply create a new key to unlock the USB dongle because only those keys programmed by the administrator will unlock the locking mechanism.

BRIEF DESCRIPTION OF THE DRAWINGS

The invention is described in detail below with reference to the appended drawings.

FIGS. 1 through 9 depict a USB locking dongle, and FIGS. 10 through 13 are flow charts depicting the programming and electronic operation of the USB Port Lock and Electronic Key Device Programming System.

FIG. 7 depicts a sectional view of the USB locking dongle in an unlocked position, while

DETAILED DESCRIPTION OF THE INVENTION

The invention is described in detail in the following paragraphs with reference to the attached drawings. Throughout this detailed description of the invention, the disclosed embodiments and features are to be considered as examples, rather than being limitations to the invention. Modifications to particular examples within the spirit and scope of the present invention, set forth in the appended claims, will be readily apparent to one of ordinary skill in the art. Further, reference to various embodiments of the disclosed invention does not mean that all claimed embodiments or methods must include every described feature. The various disclosed embodiments and features of the invention may be used separately or together, and in any combination. Terminology used herein is given its ordinary meaning consistent with the exemplary definitions set forth below.

The present invention is directed to a system for programming and operating a USB locking dongle. The USB Port Lock and Electronic Key Device Programming System comprises a system for programming a USB locking dongle that physically locks into a USB port and an programming an electronic key to unlock the dongle and release the dongle from the port. The USB Port Lock and Electronic Key Device Programming System can be installed into any computer port regardless of whether the computer is powered on. A user simply inserts the USB locking dongle into the USB port of a computer or electronic device. The user slides the external lock housing 12 over the inner case 6, manually locking the USB dongle into the port.

Figure 1:
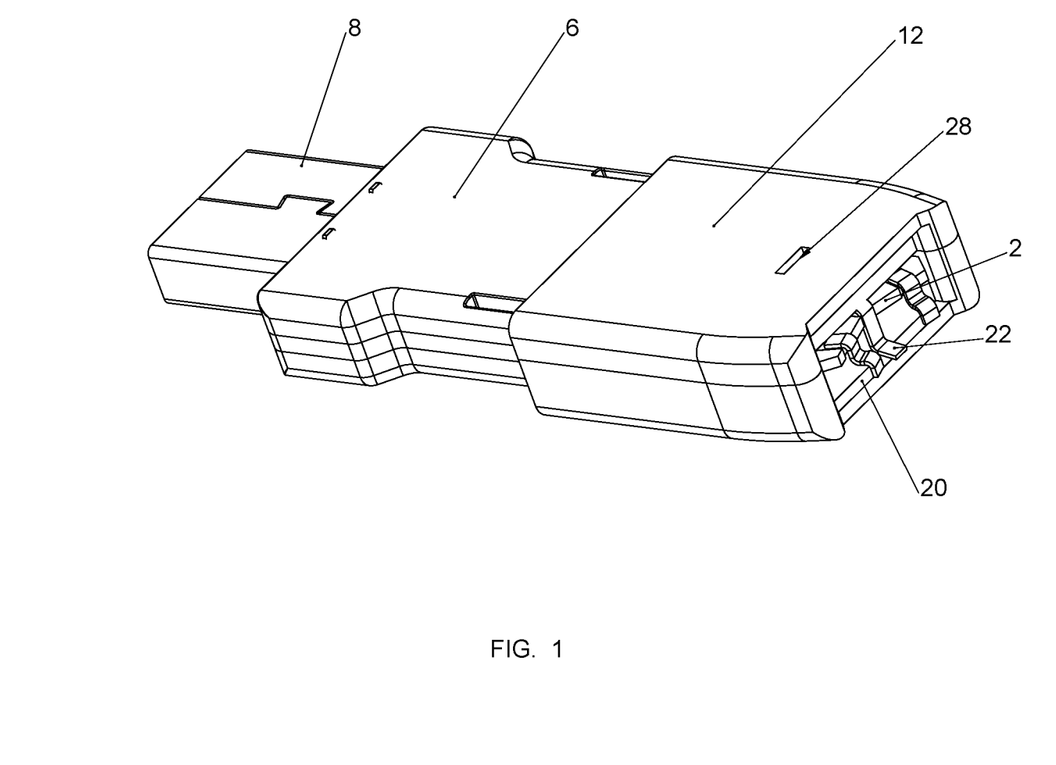
FIG. 1 illustrates a top view of an unlocked USB locking dongle angled so that the side is also depicted.

The USB dongle comprises a plug 8 that fits into the USB port, blocking access to said port, an external lock housing 12 that encloses the locking mechanism, and an interface to electronically interact with a key. FIG. 1 illustrates an angled, top view of the USB locking dongle in an unlocked position. The USB shell or plug 8 is configured to fit within a USB port. The plug 8 is composed of metal or other suitable material to mechanically plug a USB port. The external lock housing 12 mechanically slides over an inner case 6 to engage the USB Port Lock and Electronic Key Device Programming System into the USB port. Both the external lock housing 12 and the inner case 6 are composed of plastic or other suitable material that is rigid, resistant to physical impact, and cost effective to manufacture.

The USB Port Lock and Electronic Key Device Programming System is shown in an unlocked position in FIG. 1. When the USB Port Lock and Electronic Key Device Programming System is in an unlocked position the printed circuit board 2 is pushed away from the plug 8 so that the key terminals 22 are not accessible to an electronic key device because they do not extend far enough out from the USB locking dongle to make contact with said electronic key. FIG. 1 illustrates the location of the key platform 20, which provides a platform to receive a preprogrammed electronic key device to unlock the USB Port Lock and Electronic Key Device Programming System. An electronic key engages with the plurality of key terminals 22 that project from the printed circuit board 2. Three key terminals 22 are depicted in one embodiment. The number of key terminals 22 may vary depending upon what embodiment of electronic key is utilized. The key terminals 22 are soldered to the printed circuit board 2 at the end of the printed circuit board 2 near the key platform 20. This embodiment contains three key terminals 22. The electronic key transfers electronic data including a key code that is specifically programed for unlocking a particular USB locking dongle. While an iButton® is disclosed as the preferred embodiment of the electronic key, other methods of signal transfer between a key and an electronic USB lock may also be used. Any memory device that stores a key code in nonvolatile memory and allows the transfer of data such as a security key code or similar code, may be used instead of an iButton®.

FIG. 1 illustrates the location of a LED light 28 which is positioned on the top of the external lock housing 12 in this embodiment. The LED light 28 indicates the status of the USB locking dongle. The LED light 28 comprises both a red and a green light. The solenoid 46 (shown in FIG. 2) controls the LED light 28. The LED light 28 flashes red to indicate that the USB locking dongle is locked or engaged via one or more protruding barbs 14 in the female connector of a USB port on a computer or electronic device. When the LED light 28 is flashing red, attempted removal of the USB locking dongle will severely damage the USB port making the port inoperable. The LED light 28 flashes green to indicate that neither of the protruding barbs 14 is engaged with the female connector of the USB port. When the USB Port Lock and Electronic Key Device Programming System LED light 28 is flashing green, the USB locking dongle can be safely removed from the USB port.

Figure 2:
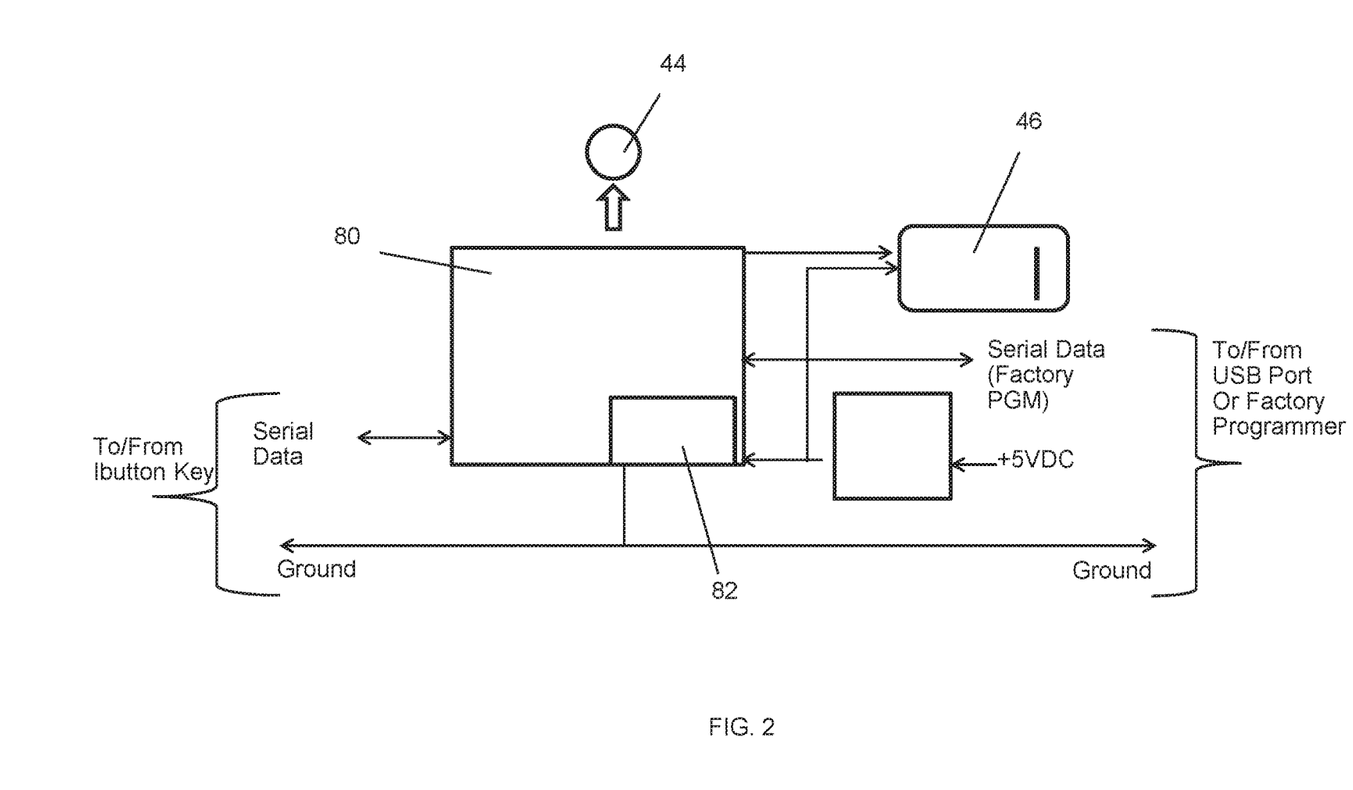
FIG. 2 illustrates the configuration of the electronic mechanism of the USB locking dongle.

The configuration of the electronic locking mechanism located with the lock housing 12 of the locking dongle is depicted in FIG. 2. The key electronic component of the USB locking dongle is the central processing unit 80 (hereinafter "CPU"). The CPU 80 contains the firmware that performs all functions in the system and has the non-volatile memory 82 necessary to store the serial number, group ID, and other data elements that are used for decoding the electronic memory device or iButton® 26. The CPU 80 controls the communications channel for interfacing and transferring information to and from the iButton® 26. Additionally, the CPU 80 controls the communications channel for transferring information to and from the programmer. The CPU 80 can be used to transmit data to the computer when the USB Port Lock and Electronic Key Device Programming System is engaged in the USB port. The CPU 80 also can be utilized to communicate with the computer to send data to the programmer relating to any attempts to remove the USB Port Lock and Electronic Key Device and Programming System.

Figure 3:
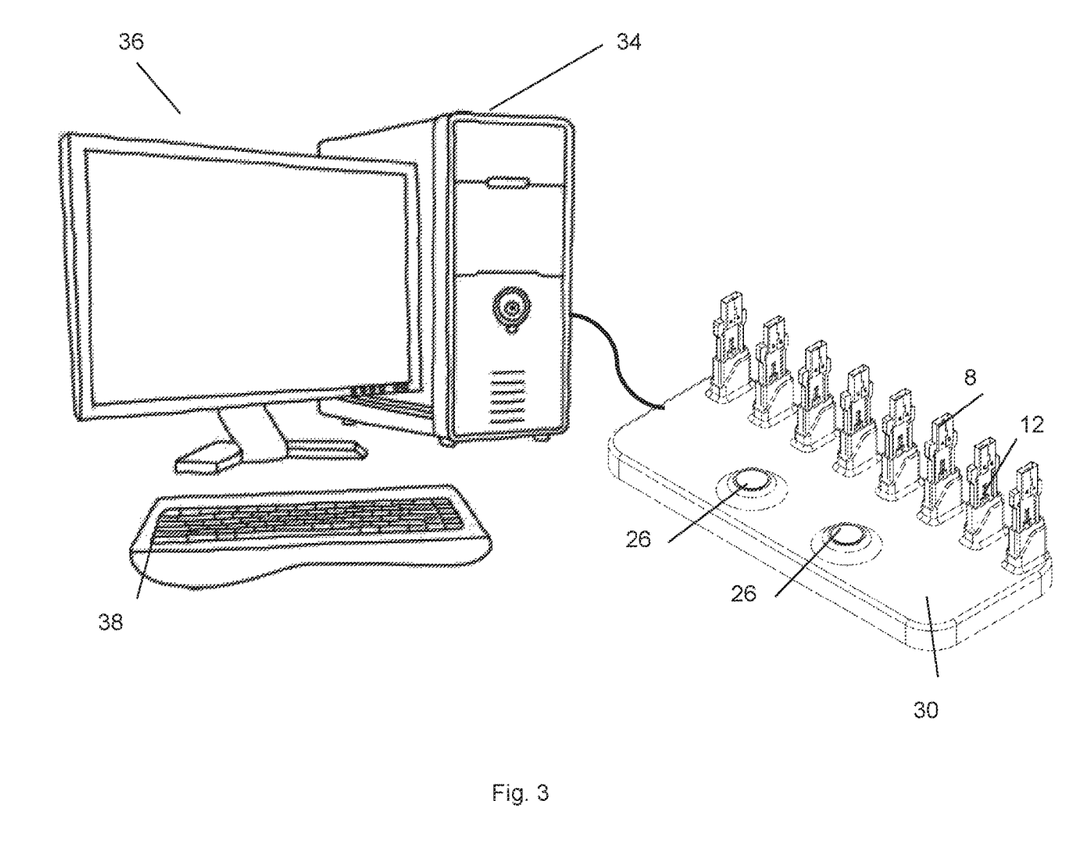
FIG. 3 illustrates the USB Port Lock and Electronic Key Device Programming System programming system.

FIG. 3 illustrates the software and hardware components of the USB Port Lock and Electronic Key Device Programming System. The software and hardware components enable the programming of the iButton® 26 with the appropriate response so that the USB locking dongle can be disengaged from the USB port. The programmer consists of a computer hard drive, monitor, and key board (34, 36, and 38 respectively), a programming station 30 that can hold one or two iButton®s 26 and up to eight USB locking dongles. The computer hard drive 34 will maintain a database or be attached to a database server for the assignment of and storage of the USB locking dongle key codes. The computer hard drive 34 is attached via a USB port to the programming station 30 where it is capable of integrating and programming each iButton® 26 and each USB locking dongle. The programmer will start the programming application and insert one or more 26 and one or more USB locking dongles into 30. The programming application will allow the creation of keys and locks, the programming of a new key for an existing lock, or the programming of one or more new locks for an existing key.

Figure 4:
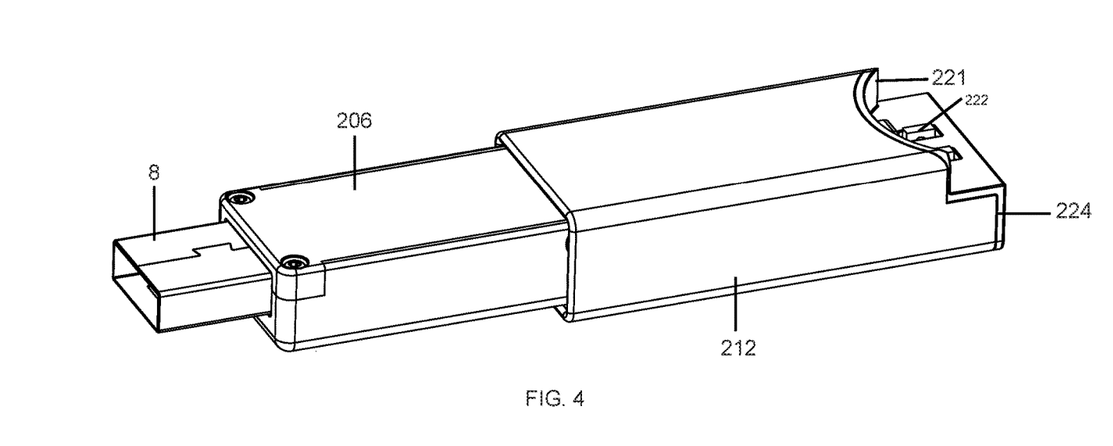
FIG. 4 depicts an exterior, top angled view.
Figure 5:
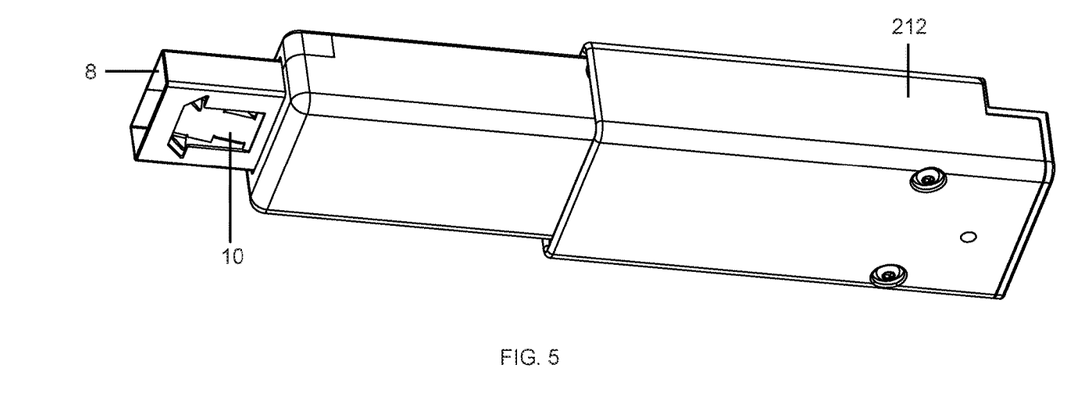
FIG. 5 depicts an exterior, bottom angled view of a locking dongle.
Figure 6:
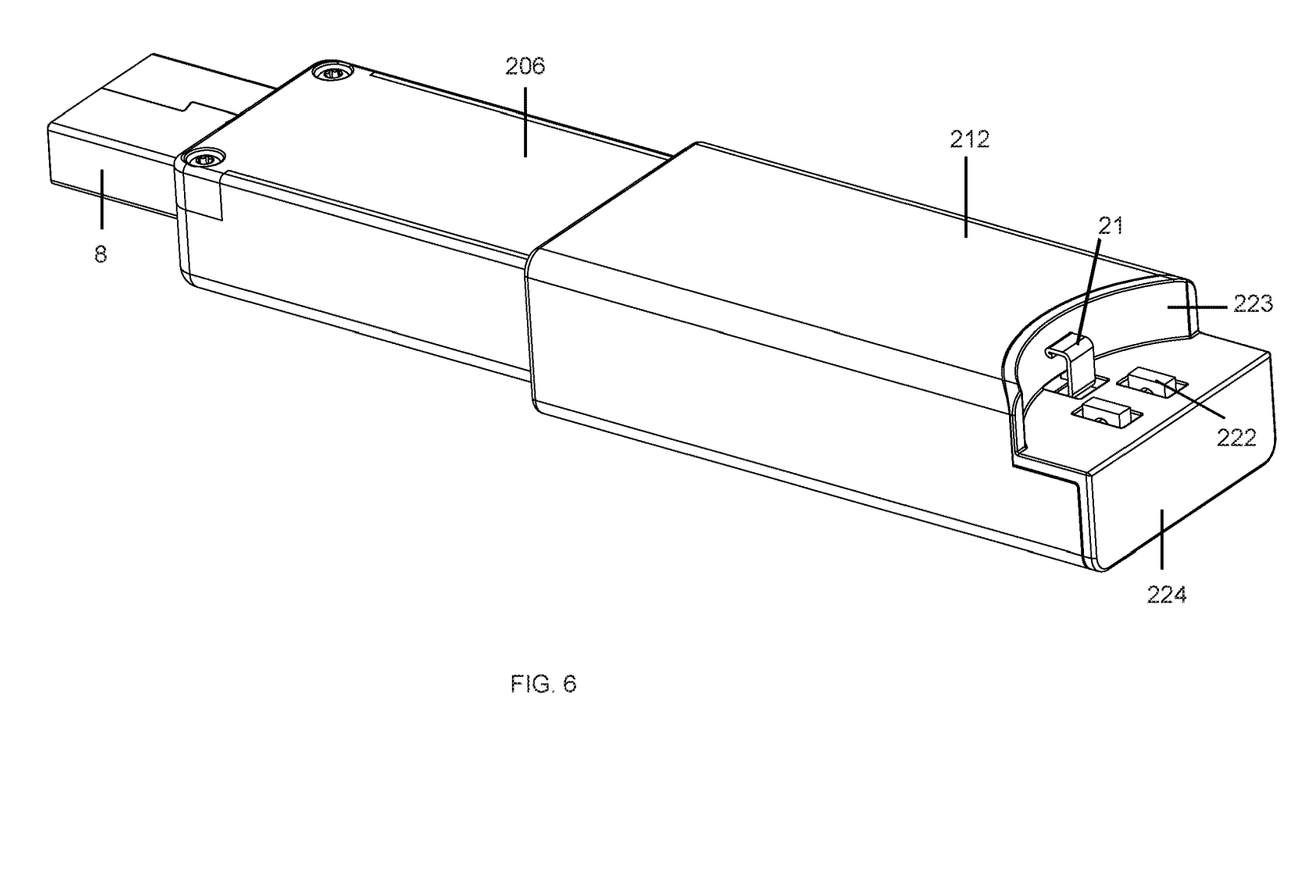
FIG. 6 depicts an exterior, angled view of the USB locking dongle.

An exterior, top angled view of the hook casting embodiment is shown in FIG. 4. Plug 8 is composed of metal or other suitable material to mechanically plug a USB port. Inner case 206 freely slides within outer case 212 when in an unlocked position. An iButton® is positioned against rear sidewall 221 so that it interacts with key terminals 225. Rear sidewall 224 encases rear surface of the device. Inner case 206, outer case 212, and rear sidewall 224 are composed of a suitable material, such as sheet metal, to protect the internal components of the USB Port Lock and Electronic Key Device Programming System and to resist water, corrosion, and tampering. FIG. 5 depicts an exterior, angled view of the bottom of the USB Port Lock and Electronic Key Device Programming System. The top and bottom portions of outer case 212 are secured tightly together with screws shown in this illustration. Plug 8 includes spring tab 10 that contains barbs 14 (Shown in FIG. 8) that are utilized to anchor plug 8 into the USB port. FIG. 6 shows rear sidewall 223 that is shaped to receive an iButton®. Key terminals 21, and two key terminals 222 interact with an iButton® to initiate the unlock function.

Figure 7:
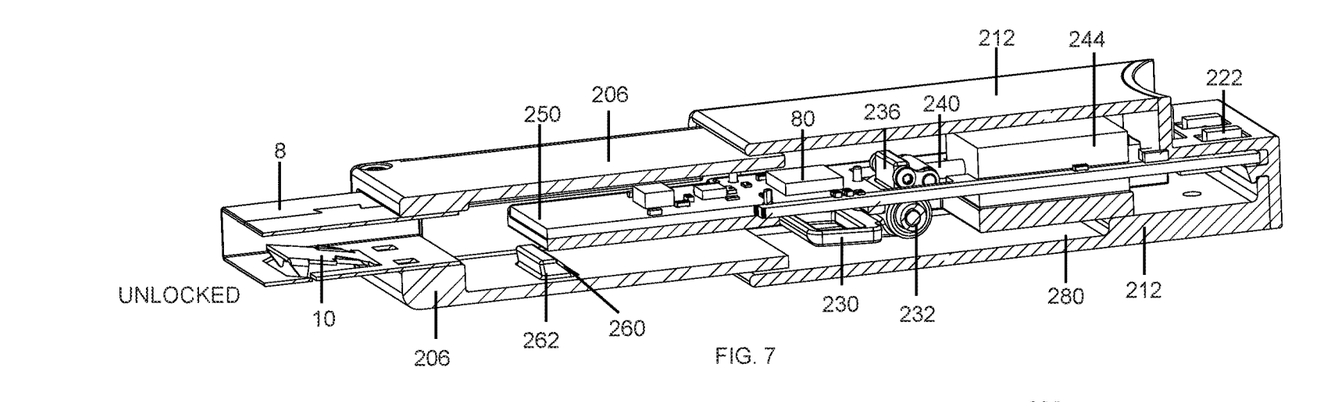
Figure 8:
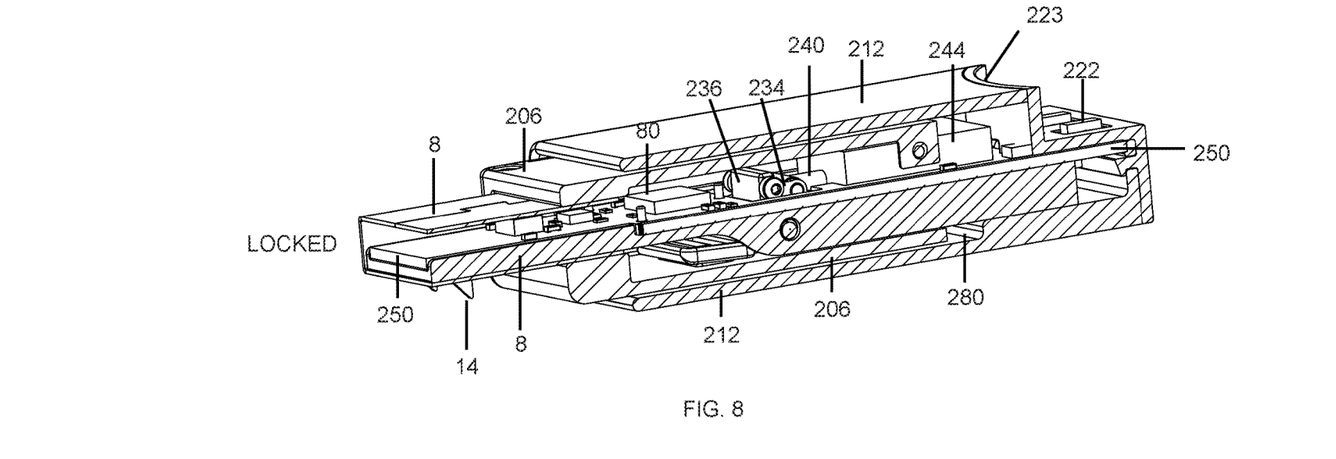
FIG. 8 depicts a sectional view of the USB locking dongle in the unlocked position.

Sectional illustrations of the USB Port Lock and Electronic Key Device Programming System in both unlocked and locked positions is shown in FIGS. 7 and 8, respectively. FIG. 7 depicts the unlocked position: spring tab 10 is not engaged with a USB port, inner case 206 moves freely in and out of outer case 221, solenoid 244 in not powered on, the hook 230 of the hook casting member (hook 230, solenoid link mount 236, and cast chassis mount 232) is not in contact with the cast latch ramp 260 or the cast latch shelf 262, the printed circuit board 250 moves freely within inner case 206, and key terminals 222 are not receiving the correct signal from a corresponding iButton®. FIG. 8 illustrates the locked position wherein: printed circuit board 250 is engaged with spring tab 10 forcing barbs 14 into the USB port plugging it, inner case 206 is fully contracted within outer case 212 and is no longer able to freely move back and forth, hook 230 is secured upon cast latch shelf 262, solenoid 244 is powered "off", solenoid arm 240 is in a locked position, solenoid link mount 236 is perpendicular to printed circuit board 250, and key terminals 222 are accessible to an iButton®.

Figure 9:
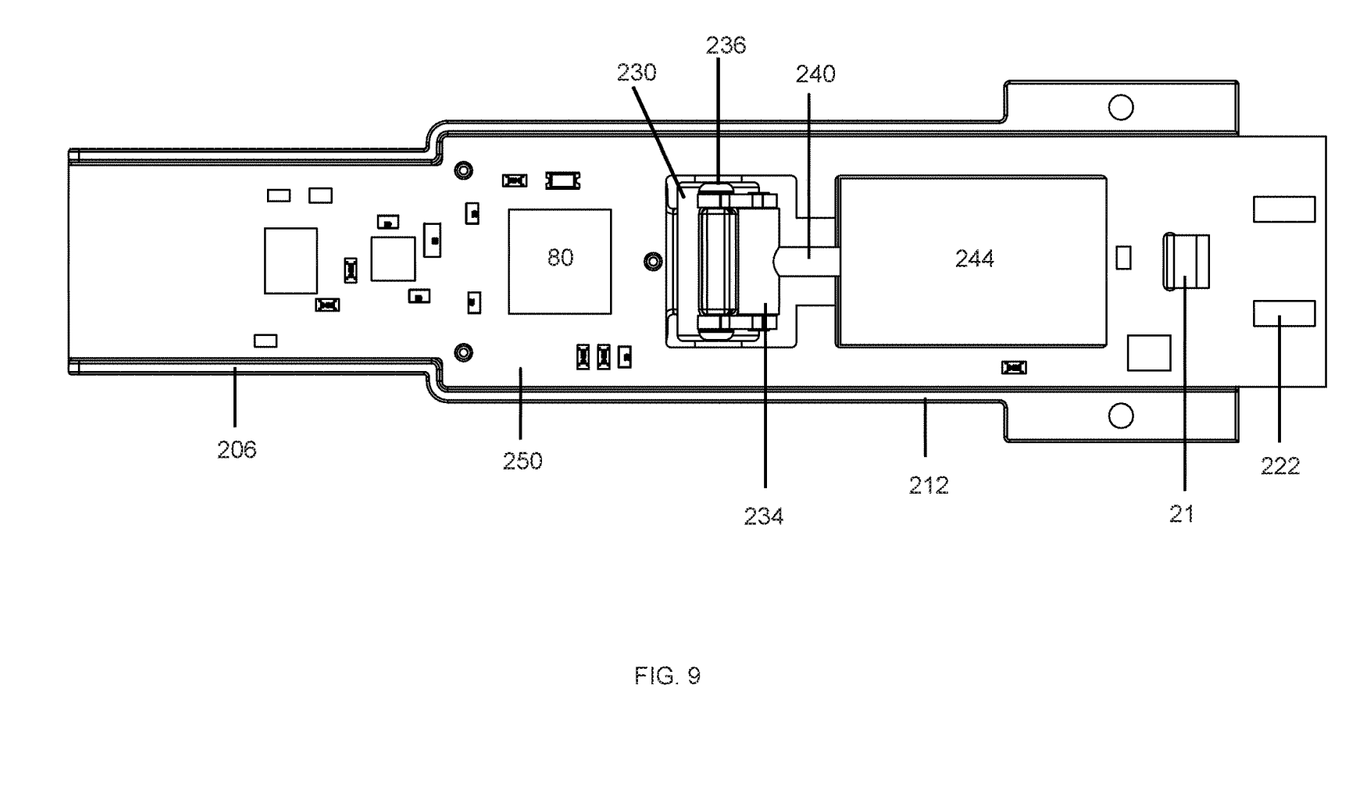
FIG. 9 depicts a top view of the printed circuit board contained within the USB locking dongle.

FIG. 9 depicts a top view of printed circuit board 250. Solenoid link mount 236 is positioned perpendicular to printed circuit board 250 in an "off" position. CPU 80 processes and controls the unlocking of the USB locking dongle. Hook 230 can be seen beneath solenoid link mount 236. Solenoid pull 234 connects to solenoid arm 240 and to chain link 233. When the correct iButton® interacts with key terminals 222 and 21, the solenoid 244 is powered "on", which causes solenoid arm 240 to retract within solenoid 244, pulling solenoid pull 234. The pulling motion of solenoid pull 234 causes chain links 233 to pull solenoid link mount 236 so that it is no longer perpendicular to printed circuit board 250, which moves hook 230 into an unlocked position.

Figure 10:
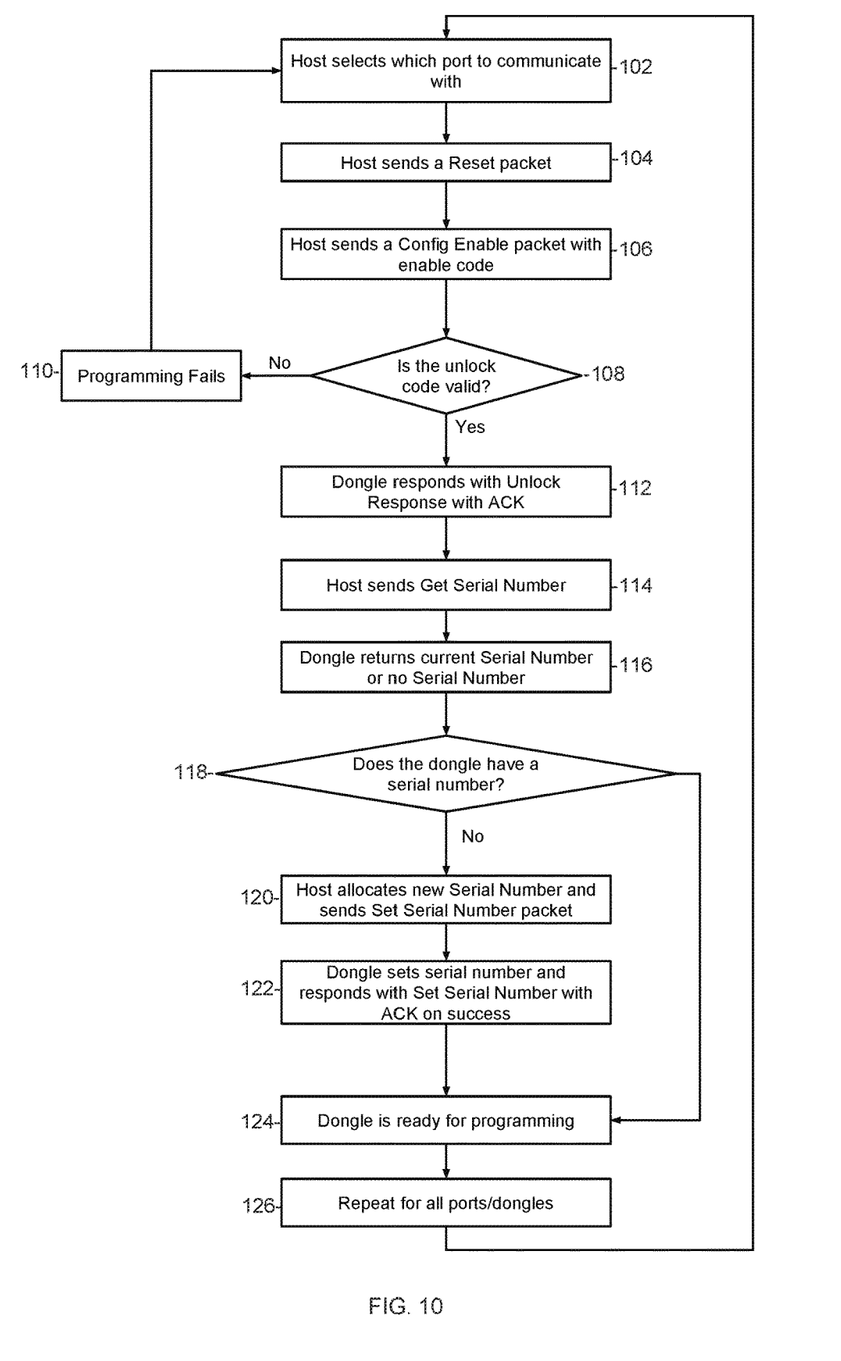
FIG. 10 is a flow chart that illustrates the programming steps to initialize the USB locking dongle.

FIG. 10 is a flow chart that illustrates an example of the steps to initialize the USB locking dongle for programming. Upon placing one or more USB locking dongles into the programming station 30, the programmer takes the steps as set forth in FIG. 10. The USB locking dongle is inserted into the programming station 30 so that the external lock housing 12 contacts a port on the programming station 30 and the terminal pins 22 (not shown) are in contact with receptors (not shown) located on the programming station 30. During the first step, Box 102, the programmer utilizes the Host PC (34, 36, and 38) to select to program the port(s) located on the programming station 30 that corresponds to the port wherein the USB locking dongle is inserted. Next, at Box 104 and 106, the Host PC (34, 36, and 38) performs housekeeping functions to prepare the USB locking dongle to receive data by initializing memory registers with predetermined initialization values along with other functions in preparation for programming. The Host PC (34, 36, and 38) sends a "Reset" packet at Box 104 and, a "Config Enable" packet at Box 106 with the enable code. The "Config Enable" packet contains the code that will unlock the USB locking dongle. If the unlock code sent by the Host PC (34, 36, and 38) is valid at Box 108, then the USB locking dongle responds with an Unlock Response with Acknowledgment (hereinafter "ACK") at Box 112. The "Unlock Response with ACK" command informs the Host PC (34, 36, and 38) that a valid code has been received and the USB locking dongle is ready to accept information. If the unlock code sent by the Host PC (34, 36, and 38) is invalid at Box 108, then the programming fails at Box 110 and the initialization process must be repeated starting with Box 102.

Once the USB locking dongle responds with an "Unlock Response with ACK" Box 112, the Host PC (34, 36, and 38) sends the "Get Serial Number" command at Box 114. The USB locking dongle returns either a current "Serial Number" or no "Serial Number" reply to the Host PC (34, 36, and 38) at Box 116. The Serial Number is a unique number used to identify the USB locking dongle or other device. If the USB locking dongle does not have an assigned Serial Number at Box 118 as when the electronic key is not an iButton®, then the Host PC (34, 36, and 38) allocates a new Serial Number to the USB locking dongle and sends to the dongle a "Set Serial Number" packet assigning a new Serial Number to the dongle Box 120. The Serial Number is assigned so that it will correspond to a particular iButton® 26 or set of iButton®s 26. Upon receipt of the newly assigned Serial Number, the USB locking dongle sets the Serial Number so that it is identified by said Serial Number at Box 122. Additionally, the USB locking dongle responds to the Host PC (34, 36, and 38) with the "Set Serial Number with ACK" response to communicate to the Host that the assigned Serial Number has been successfully assigned and stored in the USB locking dongle memory. The USB locking dongle is now ready for programming, Box 124. The process from Box 102 to Box 124 must be repeated for all USB locking dongles to be initialized.

Figure 11:
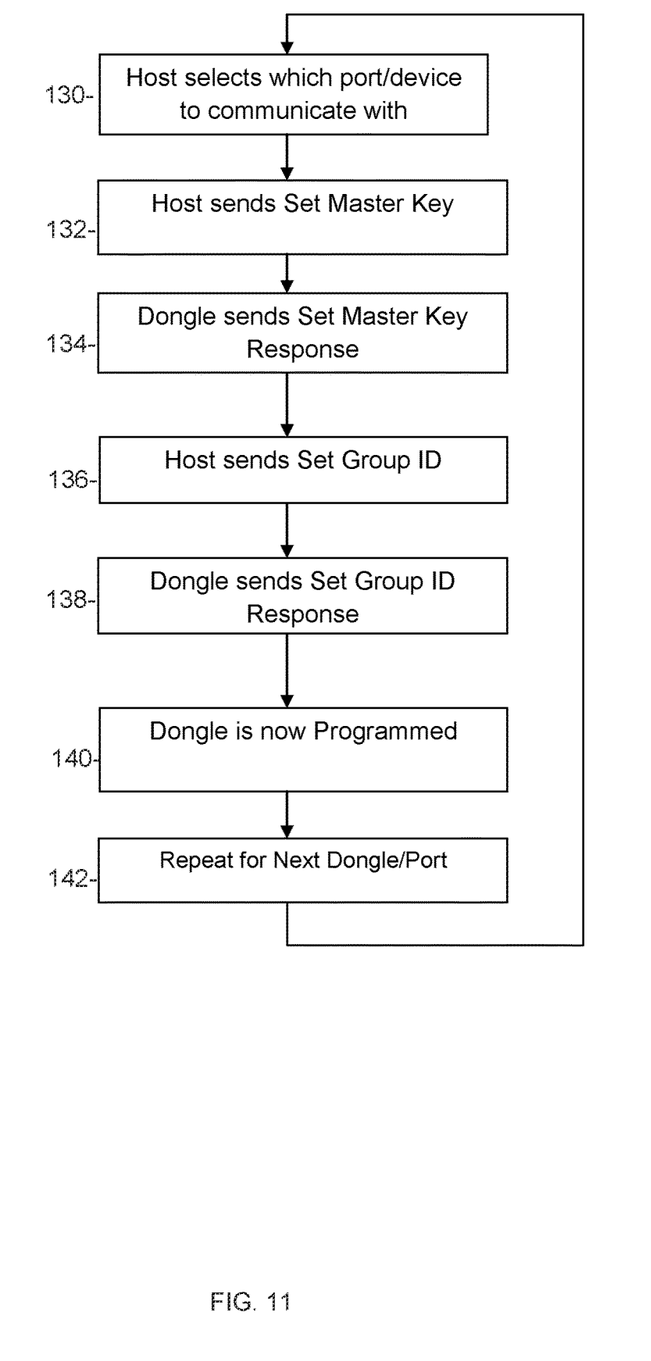
FIG. 11 is a flow chart that illustrates the programming of a USB locking dongle.

FIG. 11 illustrates the programming of a USB locking dongle by the Host PC (34, 36, and 38). These steps can be taken to either program or reprogram a USB locking dongle. The first step in the programming process is the selection by the Host PC (34, 36, and 38) of which port/device to communicate with at Box 130. Then the Host PC (34, 36, and 38) sends the "Set Master Key" command to the USB locking dongle. The USB locking dongle contains a value known as the Master Key. The Master Key is used to encrypt and decrypt the Memory Encode Key as well as being part of the signature encrypt and decrypt process. The USB locking dongle responds to the "Set Master Key" command at Box 132 by sending a "Set Master Key Response" command at Box 134 to the USB locking dongle. Next, the Host PC (34, 36, and 38) sends to the USB locking dongle a "Set Group ID" command at Box 136. The Group ID is specific to a USB locking dongle or group of USB locking dongles, corresponds to the Group ID assigned to a particular electronic key device, and is used as part of the encryption protocol to unlock the USB locking dongle. Upon receipt of the "Set Group ID" command at Box 136, the Group ID is assigned to the USB locking dongle and the dongle sends a "Set Group ID Response" shown in Box 138 to the Host PC (34, 36, and 38). The "Set Group ID Response" shown in Box 138 informs the Host PC (34, 36, and 38) that the USB locking dongle is properly programmed at Box 140. Steps shown in Boxes 130 through 140 are repeated for each USB locking dongle to be programmed, Box 142.

Figure 12:
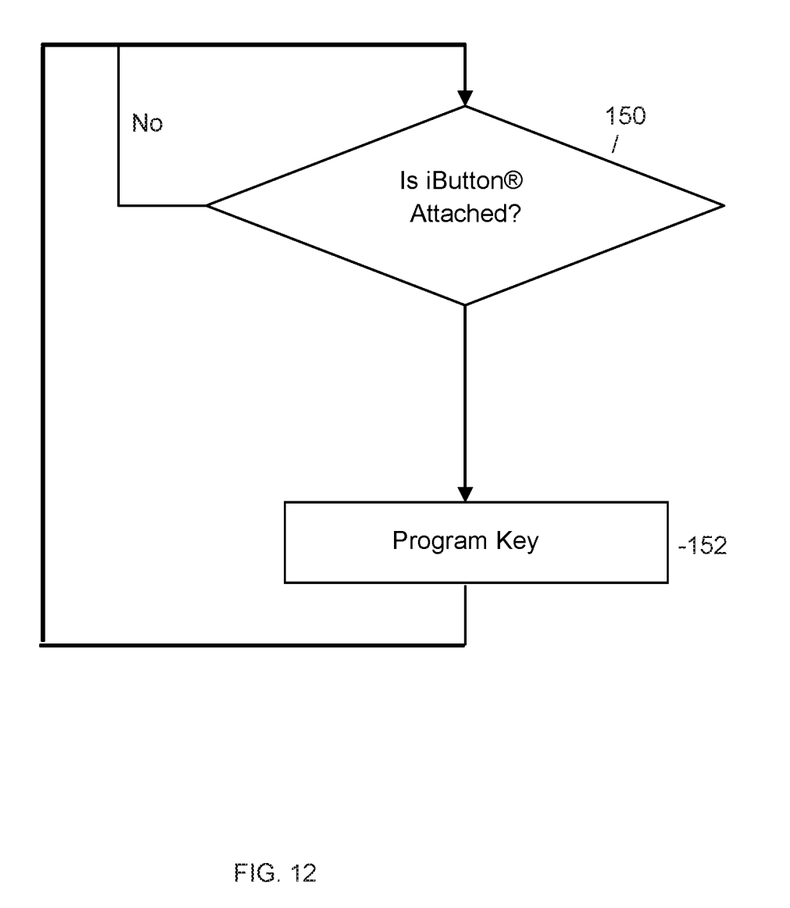
FIG. 12 is a flow chart that illustrates the programming of an iButton® 26.

FIG. 12 illustrates the process of programming an iButton® 26 to function as an electronic key that can unlock the USB locking dongle from a USB computer port. When an iButton® 26 is positioned on the correct port of the programming station 30 for programming at Box 150, the Host PC (34, 36, and 38) programs the iButton® 26 to unlock a specific USB locking dongle or group of USB locking dongles. Upon purchase, an iButton® 26 does not need to be programmed with a Serial Number because it comes pre-programmed with a Master Key that is used to encrypt and decrypt the Memory Encode Key and is part of the signature encrypt and decrypt process. While the encryption/decryption process of the instant invention is proprietary, it should be apparent to one of ordinary skill in the art that any suitable encryption/decryption scheme may be used, such as any fo the RSA variants, DES, and so forth. The Host PC (34, 36, and 38) retrieves the Master Key from the iButton® 26 and randomly generates a Memory Encode Key. The Memory Encode Key is then encrypted using a proprietary encryption scheme with the Master Key. The Master Key and the plain text Memory Encode Key and the Group ID's for a specific iButton® 26 are all encrypted creating a signature, which is appended to the Memory Encode Key and stored on the iButton® 26. The information stored on the iButton® 26 is broken down into segments with each segment having a cyclic redundancy check computed and stored on the iButton® 26. Each iButton® 26 can be programmed with multiple signatures until the device is full.

Figure 13:
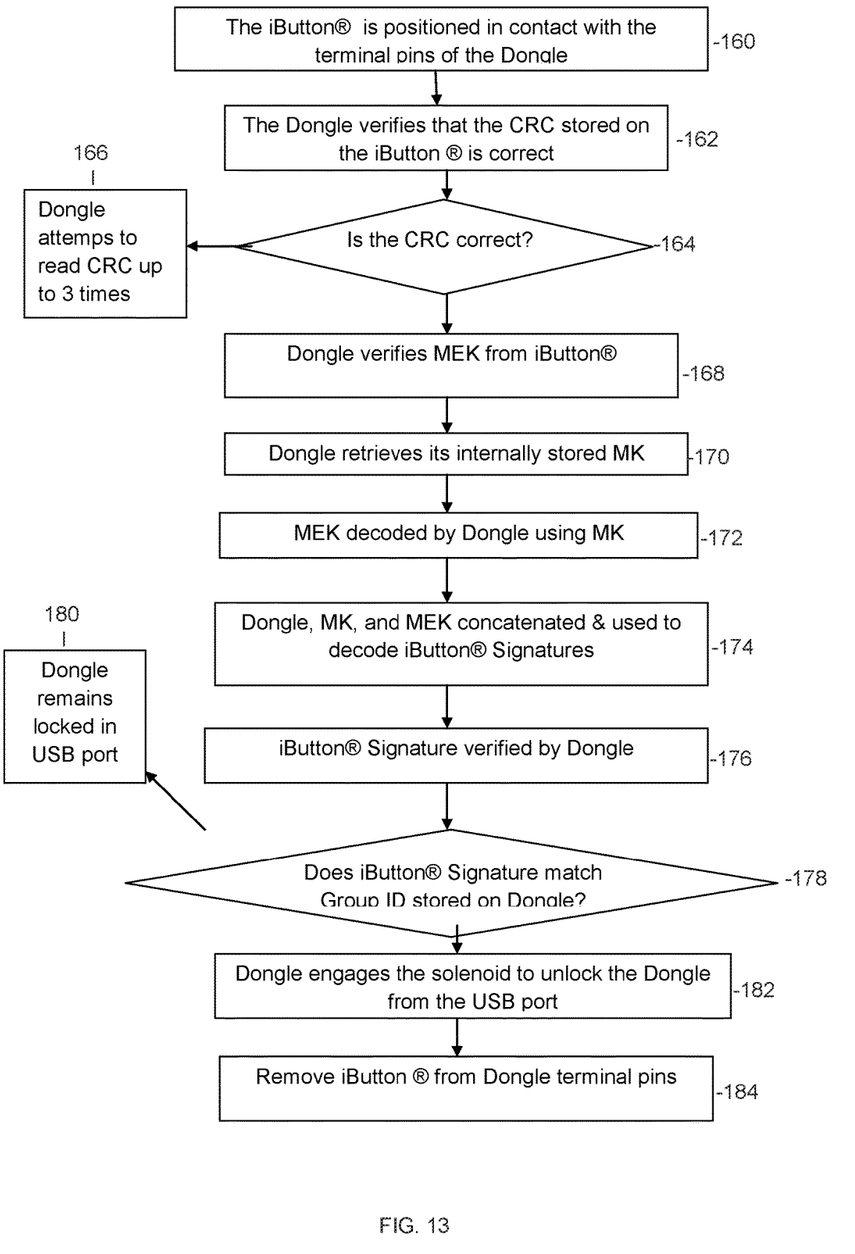
FIG. 13 is a flow chart that illustrates decoding of the iButton® 26 or electronic key device to unlock the USB locking dongle.

FIG. 13 is a flow chart depicting the steps in decoding the iButton® 26 to unlock the USB locking dongle. Upon positioning the iButton® 26 or electronic key device in contact with the terminal pins 22 of the USB locking dongle at Box 160, the USB locking dongle verifies that the cyclic redundancy check stored on the iButton® 26 is correct, Box 162. The USB locking dongle retrieves a data page of non-volatile memory from the iButton® 26 to verify that the cyclic redundancy check is correct at Box 162. If the cyclic redundancy check stored on the iButton® 26 or other electronic key device is incorrect at Box 164, then the USB locking dongle attempts to read the cyclic redundancy check up to three more times at Box 166. Prior to unlocking, the LED light 28 flashes red to indicate that the USB locking dongle can not be removed from the port. If the cyclic redundancy check can not be verified, the unlock procedure can not be initiated and the USB locking dongle remains locked in the USB port or other computer interface port plugging said port. If the cyclic redundancy check is correct Box 164, then the USB locking dongle verifies that the Memory Encode Key stored on the iButton® 26 is correct at Box 168. Next, the USB locking dongle retrieves its internally stored Master Key at Box 170 and uses the Master Key to decode the Memory Encode Key stored on the USB locking dongle at Box 172. The USB locking dongle concatenates the Master Key and the Memory Encode Key together and uses them to decrypt each signature retrieved from the iButton® 26 at Box 174. Once the iButton® 26 signature is verified by the USB locking dongle at Box 176, the USB locking dongle confirms that the iButton® 26 signature matches the Group ID stored on the USB locking dongle at Box 178. If the Group ID does not match at Box 178, then the USB locking dongle remains locked within the USB port or other computer interface port at Box 180. The LED light 28 flashes red to indicate that the USB locking dongle is in a locked position. If the signature and Group ID coded on the iButton® 26 don't match the USB locking dongle, the next signature key is decoded and verified. If no valid signature is decoded, the LED light 28 displays a red color. If the iButton® 26 signature matches the Group ID stored on the USB locking dongle at Box 178, then the solenoid within the USB locking dongle engages to unlock the USB locking dongle from the USB port at Box 182. The LED light 28 flashes green to indicate that the USB locking dongle is unlocking. The iButton® 26 or electronic key device may be removed from the terminal pins 22 of the USB locking dongle once the unlock mechanism begins within the USB locking dongle, Box 184.

We hereby claim:

1. A system that unlocks a locking member from a USB computer port comprising:
   programming a USB computer port locking member with a unique lock code, wherein said unique lock code identifies said USB computer port locking member as a USB computer locking port member;
   programming a key device with a unique key code, wherein said unique key code identifies said key device as the key device; wherein said unique key code identifies said key device as being a key that unlocks said USB computer port locking member;
   unlocking said USB computer port locking member from the USB computer port when it receives said unique key code from said key device,
   wherein said USB computer port locking member will not recognize an unlocking code sent by the computer wherein the USB computer port is located.

2. The system of claim 1, further comprising a system administrator, wherein the system administrator comprises a computer or server, wherein the system administrator comprises a data base is maintained for the assignment and storage of a locking dongle and key member codes, wherein the system administrator does not include the USB computer port.

3. The system of claim 1, wherein the key device comprises an iButton®.

4. The system of claim 1, wherein the USB computer port locking member sends data to the computer wherein it is installed to notify said computer that an attempt to remove said USB computer port locking member has been made.

5. The system of claim 1, wherein two or more key devices are programmed to unlock a single USB computer port locking member.

6. The system of claim 1 further comprising a programming station comprising a computer hard drive that transfers programming data to a programming station, wherein the programming station is electrically coupled to at least one USB computer port locking member and at least one key device.

7. The system of claim 1, wherein the system that unlocks a locking member from a USB computer port does not communicate with a server, wherein the system that unlocks a locking member from a USB computer port does not receive the unique key code from a server, and the system that unlocks a locking member from a USB computer port does not transmit the unique key code to a server.

8. A system for programming a USB computer port locking member and a key device comprising the following:
   a USB computer port locking member that blocks a USB computer port,
       wherein the USB computer port locking member further comprises a central processing unit that contains firmware that performs all functions in the system; wherein the central processing unit processes the unlocking of the USB computer port locking member independent of the host computer wherein the USB computer port locking member is installed; wherein said central processing unit stores a serial number, group ID, and other data elements used for decoding a key device;
       wherein the central processing unit controls the communications channel for interfacing and transferring information to and from the key device;
   a key device that unlocks the USB computer port locking member from the USB computer port;
       wherein said key device contains non-volatile memory, wherein said non-volatile memory stores a serial number, group ID, and other data elements used for decoding the USB computer port locking member;
   wherein the USB computer port locking member will not disengage from the USB computer port unless the correct serial number, group ID, and other data elements are received from a key device;
   wherein the serial number is a number assigned to a particular key device; wherein the group ID is a number assigned to a specific USB computer port locking member; and
   wherein said USB computer port locking member will not recognize an unlocking code sent by the computer wherein the USB computer port is located.

9. The system of claim 8, wherein an iButton® is the key device.

10. The system of claim 8, further comprising a system administrator, wherein the system administrator is a computer or server other than the computer wherein the USB computer port locking member is installed, wherein the system administrator includes a data base; wherein the data base assigns and stores at least one locking dongle and at least one key member code.

11. The system of claim 8, wherein the USB computer port locking member sends data to the computer wherein it is installed to notify said computer that an attempt to remove said USB computer port locking member has been made.

12. The system of claim 8, wherein two or more key devices are programmed to unlock a single USB computer port locking member; wherein each key device independently unlocks the USB computer port locking member from the USB computer port.

13. The system of claim 8 further comprising a programming station; wherein the programming station comprises a computer hard drive that transfers programming data to a programming station, wherein the computer hard drive is not coupled to the host computer; wherein the computer hard drive is not located within the host computer; wherein the programming station is electrically coupled to at least one USB computer port locking member and at least one key device.

* * * * *